July 30, 1963 D. E. MEADER 3,099,371
TACKY ADHESIVES SPREADING MACHINE
Filed March 14, 1960 2 Sheets-Sheet 1
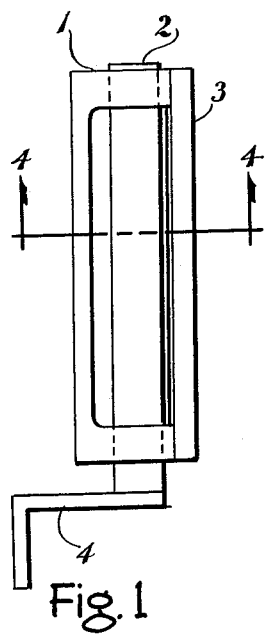
Fig.1
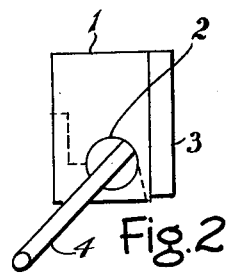
Fig.2
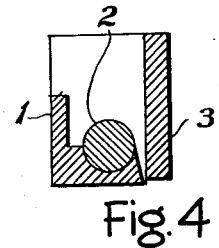
Fig.3
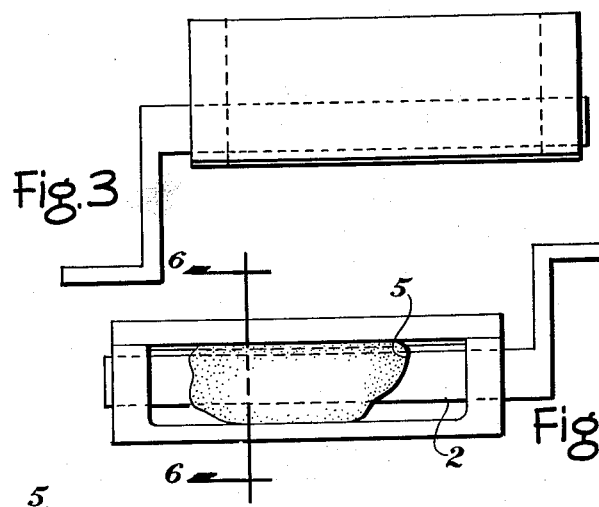
Fig.4
Fig.5
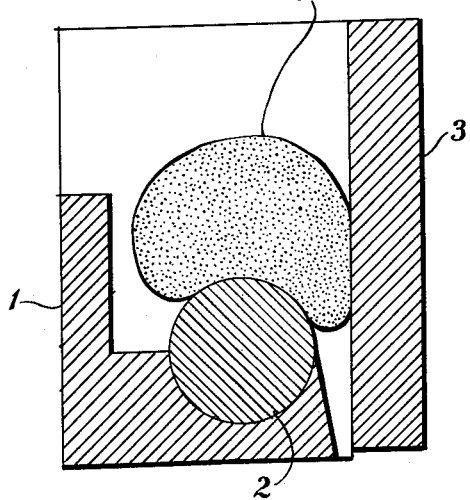
Fig.6
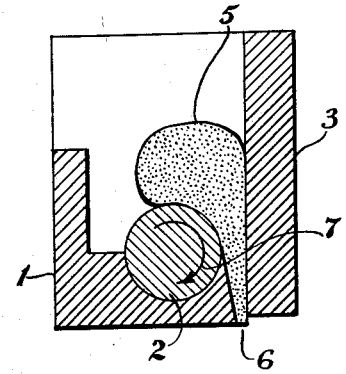
Fig.8

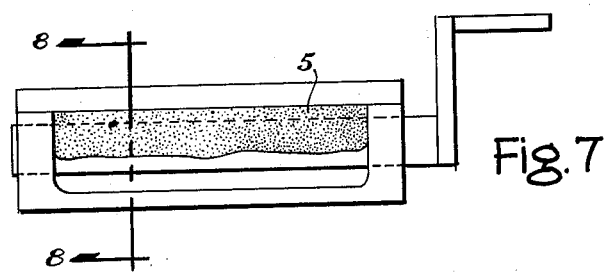
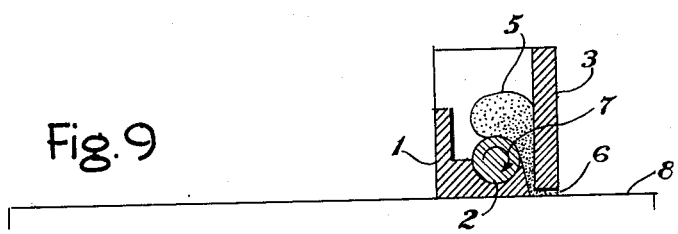
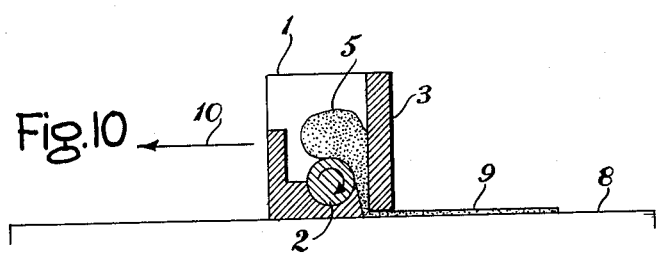
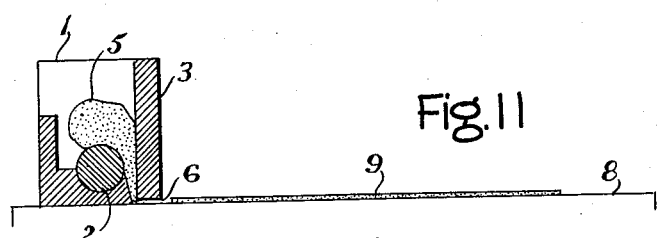
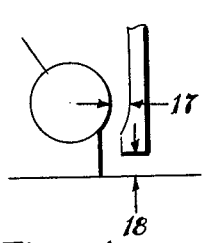
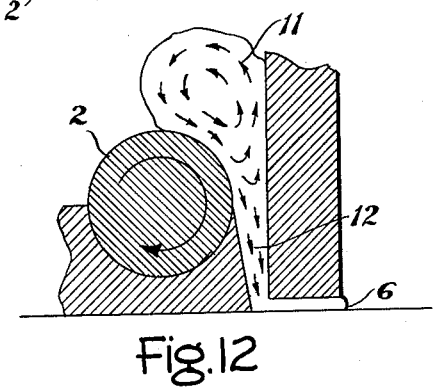
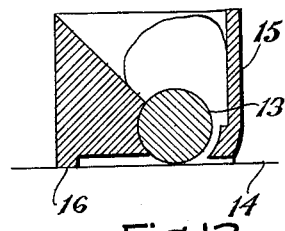

3,099,371
TACKY ADHESIVES SPREADING MACHINE
Donald E. Meader, Danvers, Mass., assignor to High Voltage Engineering Corporation, Burlington, Mass., a corporation of Massachusetts
Filed Mar. 14, 1960, Ser. No. 14,918
1 Claim. (Cl. 222—414)

The present invention relates to tools and machines used in the application of adhesives, and more particularly to a machine for spreading very sticky, tacky adhesives.

In common practice, adhesives are applied in various manners as follows:

(1) Spread by a brush
(2) Deposited by at spray gun
(3) Spread by a roller
(4) Spread by knives, blades, scrapers, etc.
(5) Extruded from pressure guns
(6) Deposited by dipping object in adhesive Heretofore in the art, tacky adhesives have been applied with extreme difficulty, mainly by spreading with a knife, blade or scraper. When spread manually, the resultant adhesive film is of non-uniform thickness and precise boundaries are difficult to obtain.

The present invention overcomes the foregoing inadequacies and limitations as well as providing additional advantageous features. This will be evident from the ensuing description and discussion.

The basic objects of the present invention are as follows:

(1) To deposit a film of tacky adhesive with the following properties:

a. Uniform, controlled thickness
b. Precise boundaries, i.e. length and width
c. Continuous, free of voids (2) To be self-cleaning during operation
(3) To operate in any position
(4) To continuously mix adhesive during operation
(5) To be self contained, not requiring connection to electricity, water, or compressed air, etc.
(6) To be portable
(7) To provide self-regulating and automatic relieving feed pressure
(8) To provide automatic, precise cut-off of adhesive film when spreading is discontinued The present invention together with further objects and advantages thereof will be better understood by reference to the following description taken in conjunction with the accompanying drawing wherein the invention and mode of operation thereof is described and illustrated.

In the accompanying drawings:

FIG. 1 is a plan view of a spreading machine constructed in accordance with the principles of the invention;

FIG. 2 is a side elevation of the spreading machine of FIG. 1;

FIG. 3 is a front elevation of the spreading machine of FIG. 1;

FIG. 4 is a sectional view along the line 4—4 of FIG. 1;

FIG. 5 is a view similar to that of FIG. 1, and illustrates the manner in which the spreading machine of FIGS. 1–4 is loaded;

FIG. 6 is a section view along the line 6—6 of FIG. 5;

FIG. 7 is a view similar to that of FIG. 1, and illustrates the manner in which the spreading machine of FIGS. 1–4 is prepared for operation after loading;

FIG. 8 is a sectional view along the line 8—8 of FIG. 7 but to an enlarged scale;

FIGS. 9–11 are sectional views similar to that of FIG. 4 and illustrate three successive steps in the operation of the spreading machine of FIGS. 1–4;

FIG. 12 is a sectional view similar to that of FIG. 4 and illustrates certain features of the invention.

FIG. 13 is a sectional view similar to that of FIG. 4 showing a modified form of the invention; and FIG. 14 is a sectional view similar to that of FIG. 4 illustrating certain principles of the invention.

Referring to FIGURES 1, 2, 3 and 4 the spreading machine comprises of a frame or body 1, an adjustable metering blade 3, a feed roll 2, and an operating crank 4.

The operation of the present invention will be better understood by discussing it in a series of steps.

First, referring to FIGS. 5 and 6, to load the spreader the adhesive 5 is placed in the spreader in contact with the feedroll 2, spreader body 1 and blade 3. It is not necessary to distribute the adhesive 5 along the feed roll 2 because one of the features of the present invention is that it automatically distributes the adhesive uniformly. Therefore it is satisfactory to deposit the adhesive 5 as shown in FIG. 5, being certain that it is in contact with the feed roll 2.

To prepare the spreader for operation, refer to FIG. 7 and FIG. 8, the feed roll 2 is rotated in the direction shown by the arrow 7 (FIG. 8). The friction of the roll 2 on the adhesive 5 transmits a force to the adhesive, forcing it down thru the passage between the spreader body 1 and the meter blade 3 to the discharge opening 6. At the same time, the forces transmitted to the adhesive 5 cause it to be distributed uniformly along the feed roll 2 as shown in FIG. 7.

To operate the spreader, after it is loaded as previously described, the spreader is placed on the surface 8 to be coated as shown in FIG. 9. The feed roll 2 is rotated as shown by arrow 7, causing the adhesive 5 to move down into contact with surface 8 at point 6. The feed roll is now rotated continuously until it is desired to discontinue applying the adhesive. The effect of this continuous rotation will be discussed later as one of the objects of the present invention.

In operation (refer to FIG. 10), with the feed roll 2 rotating continuously, the spreader 1 is moved along the surface 8 in the direction shown by arrow 10. As the spreader moves along the surface 8 with the adhesive continuously fed into contact with the surface by the feed roll 2, the adhesive 5 is spread by the metering blade 3 thereby depositing an adhesive film 9 of uniform, controlled thickness. The meter blade 3 is adjusted vertically to produce the desired thickness of adhesive film 9.

To stop the operation, refer to FIG. 11, while the spreader 1 is still moving along the surface 8, in the direction 10, rotation of the feed roll 2 is stopped, thereby removing the force that feeds the adhesive 5 down to the discharge opening 6. With the feeding force removed and the spreader 1 continuing to move in relation to the surface 8, a tensile force is exerted on the adhesive film at 6, causing it to rupture uniformly along its width.

Being of a highly elastic nature, just prior to rupture the adhesive film elongates into fine strings at point 6. Upon rupture the strings snap back to the main adhesive body— on one hand to the adhesive in the spreader, on the other hand to the adhesive film 9 on surface 8. The adhesive in the spreader retracts to a position free from contact with the surface 8, thereby preventing contamination of the surface with uncontrolled adhesive deposits.

The feature of self-regulating and automatic relieving feed pressure is illustrated in FIG. 12. As the feed roll 2 rotates the friction of the adhesive on the roll causes the adhesive to roll in a continuously moving bank 11 as shown. This exerts a pressure on the adhesive at 12 causing it to be fed to point 6. This continuous rolling action automatically regulates and relieves the feed pressure.

The continuous rolling action described above combined with the tacky nature of the adhesive causes the adhesive to adhere to itself, thereby self-cleaning the spreader.

The rolling action also serves to continuously mix the adhesive during operation. The nature of this rolling action tends to expel entrapped air, thereby eliminating a potential cause of voids in the deposited adhesive film.

From the foregoing description it will be apparent that the tacky adhesives spreading machine of the invention embodies the following features:

(1) Uniform, controlled adhesive film thickness
(2) Precise film boundaries, i.e. length and width
(3) Continuous, void free film
(4) Portable, self-contained unit
(5) Can be operated in any position
(6) Continuous mixing of adhesive during operation
(7) Feed pressure is self regulating and automatic relieving
(8) Unit is self cleaning during operation
(9) Adhesive film cut-off is automatic, uniform, neat and clean.

A modification of the invention is shown in FIG. 13. Referring thereto, a feed roll 13 may be in contact with the surface 14 upon which the tacky adhesive is to be spread. A metering blade 15 must be spaced from the surface 14 and from the feed roll 13 in a controlled way so that a frame 16 is used for this purpose and upon the frame 16 are mounted the feed roll 13 and the metering blade 15. In order that the frame 16 may cooperate in maintaining the metering blade 15 at a specified distance from the surface 14, there must be an appropriate mechanical connection between the frame 16 and the surface 14 and in the apparatus of FIG. 13 this is accomplished simply by having a surface portion of the frame 16 in contact with the surface 14.

Referring now to FIG. 14, the important dimensions are the width of the elongated aperture formed by the feed roll and the metering blade at their closest spacing from each other, indicated by the arrows 17, and the width of the elongated aperture formed by the metering blade and the surface upon which the tacky adhesive is to be spread at their closest spacing from each other indicated by the arrows 18. The width of the first aperture 17 must be small enough to build up pressure in the tacky adhesive between the first aperture 17 and the second aperture 18. The width of the second aperture 18 determines the thickness of the layer of adhesive being spread assuming that the feed roll is rotated sufficiently rapidly with respect to the transverse movement of the frame; that is to say, positive pressure must be maintained in the volume bounded by the apertures 17 and 18. The shape of the volume bounded between said apertures 17 and 18 is not particularly critical but in order to insure a clean cut-off it is desirable to minimize this volume as much as possible without unduly restricting the flow of adhesives from the first aperture 17 to the second aperture 18.

Having thus described the principles of the invention, together with an illustrative embodiment thereof, it is to be understood that although specific terms are employed, they are used in a generic and descriptive sense and not for purposes of limitation, the scope of the invention being set forth in the following claim.

I claim:

Apparatus for coating a surface with tacky adhesive comprising a frame member having a first plane surface adapted to traverse in contiguous relationship the surface to be coated, a metering blade co-operatively engaged with said frame member to establish an adhesive extrusion aperture, said aperture being in part defined by one edge of said first plane surface and the proximate end of said metering blade, said proximate end of said metering blade being offset from the plane of said first plane surface by an amount equal to the desired thickness of adhesive coating, a cylindrical feed member, a convergent channel wherethrough adhesive is delivered to said extrusion aperture, said convergent channel being defined in part by said metering blade, a second plane surface of said frame member, said second plane surface being inclined with respect to said first plane surface and having a common boundary therewith at said extrusion aperture, and said cylindrical feed member, said cylindrical feed member being parallel to said extrusion aperture and in intersecting relationship with said second plane surface, and means for rotating said cylindrical member in a direction adapted to force adhesive residing thereon through said channel.

References Cited in the file of this patent
UNITED STATES PATENTS

| | | |
|---|---|---|
| 2,320,702 | Marchese et al. | June 1, 1943 |
| 2,474,254 | Kauffman | June 28, 1949 |
| 2,494,378 | Dexter | Jan. 10, 1950 |
| 2,643,798 | Neff | June 30, 1953 |
| 2,774,327 | Saint-Hailaire | Dec. 18, 1956 |
| 2,860,597 | Works et al. | Nov. 18, 1958 |
| 2,876,039 | Vogdt | Mar. 3, 1959 |